United States Patent Office 3,108,885
Patented Oct. 29, 1963

3,108,885
GLAZE COMPOSITIONS CONTAINING HIGH TEMPERATURE PIGMENTS
Maria G. Dunseth, Brunswick, Md., assignor to W. R. Grace & Co., New York, N.Y., a corporation of Connecticut
No Drawing. Filed Sept. 6, 1960, Ser. No. 53,923
5 Claims. (Cl. 106—48)

This invention relates to the use of metal ammonium phosphates as pigments in the ceramic, enameling and glass arts.

Manufacturers' increasing respect for the sales power of color and a growing emphasis on its utility in design and decorating have led to heavy demands for more pleasing and wider ranges of colors and shades.

The group of chemical compounds that can be used for producing selective light absorption decreases rapidly as the temperature of application increases. This holds true for pigments in general and for the palette of the ceramist in particular.

For the high temperatures involved in the manufacture of glasses, glazes, enamels and ceramic bodies there are only a few compounds sufficiently stable to be used as colorants. Most of them are oxides containing an element of the transition group as the center of light absorption.

It is, therefore, an object of this invention to provide a pigment which is capable of developing a wide range of rich colors in the ceramic, enameling and glass arts.

Ceramics may be defined as the art of making articles of baked clay. A coating is usually applied to the porous clayware to render it impermeable to liquids and to provide an aesthetically attractive product. The coating or glaze is generally a silicate mixture fused on the surface of the clayware. Glazes are glasses in their physical and chemical nature, and like glasses, they are not definite chemical compounds but complex mixtures.

Another kind of superficial coating frequently used to coat claywares with or without the addition of a glaze coat is the slip. An essential difference between a glaze and a slip is the greater amount of glassy phase in the former.

An enamel is a protective and decorative vitreous coating for metals. Since ferrous metals are low in cost and require protection from corrosion, as well as decoration, enameled products of steel and cast iron are most plentiful. These are chiefly household appliances, such as bathtubs, sinks, ranges and refrigerators. The enameling of metals is probably the first instance known of the "welding" of glass to metals.

The manufacture of ceramic pigments is still based on empirical knowledge rather than scientific understanding. Crystal chemistry begins to shed light on some of the colorants, but for practical purposes the development of a certain pigment remains a compromise between several factors such as cost, stability, reproducibility, and resistance to corrosion as well as to oxidizing or reducing furnace atmospheres.

It has been found that the addition of metal ammonium phosphate to a number of glaze, slip, and enamel compositions has produced an unusually wide range of rich colors. Similar results have been observed by the addition of metal ammonium phosphate to glasses.

These colors are softer and more pleasing to the eye. Although several attempts have been made to measure colors, it is still considered psychophysical. It may be defined as a mental response to a stimulus composed of light varied in its spectral properties by chemical or physical means.

Metal ammonium phosphates on ignition decompose to form pyrophosphates. The pyrophosphates are colored when the original phosphate is colored. The reaction is as follows:

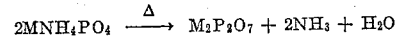

$$2MNH_4PO_4 \xrightarrow{\Delta} M_2P_2O_7 + 2NH_3 + H_2O$$

Metal ammonium phosphates may be prepared from low cost raw materials, namely wet process phosphoric acid, ammonia and various metal salts from usual sources including sea water and minerals such as langbeinite, iron ore and copper ore.

A typical reaction for the preparation of the metal ammonium phosphates is as follows:

$$MSO_4 + H_3PO_4 + 3NH_4OH \rightarrow MNH_4PO_4 + (NH_4)_2SO_4 + 3H_2O$$

where M represents a bivalent metal cation. Broadly, the process comprises dissolving a soluble salt of a bivalent metal in water, adding phosphoric acid to the solution and then neutralizing the solution by gradually adding ammonia, thereby causing the precipitation of the metal ammonium phosphates. The mixtures is digested until the precipitate is crystalline. It is then filtered, washed with water and air dried to constant weight. The process for preparing these compounds is described in the copending application Serial No. 51,541, filed August 24, 1960.

The use of metal ammonium phosphates has many advantages. Unlike some ceramic colorants, the degree of impurity in the metal ammonium phosphate does not affect its coloring powers. Several colors previously obtainable only under strict reducing conditions now can be produced under oxidizing conditions with less exacting requirements. In addition, the metal ammonium phosphates produce much finer textured coatings than have been thus far attainable.

In preparing glazes, slips and enamels, it is important to obtain a homogeneous finely divided mixture for application to the ware. The mixture can be applied in dry form or in the form of a suspension.

The coated ware is placed in a kiln and heated to temperatures high enough to reduce the coating to a vitrified condition. The temperature is contingent on the composition of the coating. The kiln atmosphere can be oxidizing or reducing depending on the results desired.

EXAMPLE I

A glaze base was prepared by mixing 35% feldspar, 22% calcium carbonate, 21% kaolin and 22% flint. 3% of boric acid was added to stabilize the glaze composition and make it hard when unfired so the pot could be handled. The glaze base was divided into batches and a metal ammonium phosphate was added to each batch as listed in Table I. The pigmented glaze composition was milled to a finely divided form, about —200 mesh, and added to water to form a suspension. The suspension was brushed on unfired clay and the clayware was then fired in a reducing atmosphere. The firing schedule was as follows:

| Approximate time | Temp., °F. | Atmosphere |
|---|---|---|
| 12 hrs | 0 to 1,200 | Very high CO. |
| 6 hrs | 1,200 to 1,800 | Low CO. |
| 6 to 8 hrs | 1,800 to 2,300 | Very high CO. |
| 20 to 40 min | 2,300 | Do. |

The glazed ware was then removed from the kiln and allowed to cool from seven to ten days.

All of the samples had an unusually pleasing matte finish somewhat suggestive of the beauty and delicacy of ancient pottery.

Table I

| | Metal ammonium phosphate | Color of metal ammonium phosphate | Percent added | Resulting colors |
|---|---|---|---|---|
| 1 | FeNH₄PO₄ | Greyish-green | 3.0 | Pale greenish blue. |
| 2 | CuNH₄PO₄ | Blue | 2.0 | Purplish-blue. |
| 3 | NiNH₄PO₄ | Green or yellow—depends on hydrate. | 5.0 | Grey. |
| 4 | CoNH₄PO₄ | Purple | 2.0 | Deep blue. |
| 5 | MnNH₄PO₄ | Pale pink | 5.0 | Brownish-grey. |
| 6 | MgNH₄PO₄ | White | 5.0 | White. |
| 7 | {CoNH₄PO₄ / FeNH₄PO₄} | }Blue | {0.5 / 5.0} | }Dark bluish-green. |
| 8 | ZnNH₄PO₄ | White | 5.0 | White. |
| 9 | UO₂NH₄PO₄ | Yellow | 5.0 | Yellow. |

EXAMPLE II

Three glaze bases were prepared according to the following formulas.

| Formula 1 | Formula 2 | Formula 3 |
|---|---|---|
| Feldspar, 50%. Kaolin, 17%. CaCO₃, 17%. SiO₂, 16%. | Feldspar, 40%. Kaolin, 15%. CaCO₃, 20%. SiO₂, 24%. | Nepheline syenite, 50 g. Kaolin, 10 g. CaCO₃, 10 g. SiO₂, 20 g. Colemanite, 30 g. Tin, 10 g. |

Each glaze base was divided into batches and a metal ammonium phosphate was added to each batch as listed in Table II. The pigmented glaze compositions, finely divided in form, were added to water to form a suspension. The suspension was brushed on unfired clay and the clayware was then fired in an oxidizing atmosphere. The firing schedule was 24 hours and the firing temperature rose to 2300° F. The samples were then slowly cooled in the kiln.

Formula 1 produced less of a matte finish than that obtained in Example I. Formulas 2 and 3 produced glossier finishes. This indicates that glossier finishes are obtained with alkaline bases.

Table II

| | Metal ammonium phosphate | Percent added | Color of metal ammonium phosphate | Resulting colors using formula 1 | Resulting colors using formula 2 | Resulting colors using formula 3 |
|---|---|---|---|---|---|---|
| 1 | FeNH₄PO₄ | ¹4.0 | Greyish-green | Greyish-green | Pale yellow | Brownish-yellow. |
| 2 | FeNH₄PO₄ | ²4.0 | ___do___ | Same as No. 1 | Same as No. 1 | Same as No. 1. |
| 3 | CdNH₄PO₄ | 5.0 | White | White matte | White | White. |
| 4 | NiNH₄PO₄ | ²3.0 | Green or yellow, depends on hydrate. | Taupe | Taupe | Pale yellow. |
| 5 | NiNH₄PO₄ | ³3.0 | Green | Same as No. 4 | Same as No. 4 | Same as No. 4. |
| 6 | MnNH₄PO₄ | 3.0 | Pale pink | Tan with pink cast | Pinkish cast in tan | Whitish ecru. |
| 7 | MnNH₄PO₄ | 8.0 | ___do___ | Deeper than No. 6 | Deeper than No. 6 | Ecru. |
| 8 | CuNH₄PO₄ | 2.0 | Blue | Green | Pale green | Pale green. |
| 9 | {CoNH₄PO₄ / FeNH₄PO₄} | {.25 / 2.0} | }Blue | Deep blue | Blue with yellowish-brown speckles | Robin's egg blue. |
| 10 | FeNH₄PO₄ | 10.0 | Greyish green | Deep brown | Brown | Brown. |
| 11 | CoNH₄PO₄ | .25 | Purple | Deep cobalt blue | Blue | Light blue. |

EXAMPLE III

An enamel base was prepared by mixing 20% cupric ammonium phosphate and 80% clear transparent flux. The base was applied with a brush to clean pieces of copper pre-treated with sulfuric acid. The coated copper pieces were fired in an oxidizing atmosphere for three minutes at a temperature of 1200° F. They were then allowed to cool. In each case a matte blue-green enamel coating was formed on the metal surface.

I claim:

1. A method for coloring ceramic ware which comprises preparing a siliceous glaze composition, admixing with said composition about 0.2 to about 10% of an ammonium phosphate salt of a divalent metal selected from the group consisting of cadmium, cobalt, copper, iron, magnesium, manganese, nickel, zinc and the uranyl radical, applying said admixture to ceramic ware, heating to a temperature and for a time sufficient to cause fusion of the glaze composition and cooling the glazed, colored ceramic ware.

2. A pigmented glaze composition comprising 35 to 50% feldspar, 15 to 21% kaolin, 0 to 22% flint, 17 to 22% calcium carbonate and 0 to 24% silica admixed with 0.2 to 10% of an ammonium phosphate salt of a divalent metal selected from the group consisting of cadmium, cobalt, copper, iron, magnesium, manganese, nickel, zinc and the uranyl radical.

3. A process for producing ceramic bodies provided with uniquely colored glazes which comprises preparing a glaze composition having as its essential ingredients 35 to 50% feldspar, 15 to 21% kaolin, 17 to 22% calcium carbonate, 0 to 24% silica, and 0 to 22% flint, mixing said ingredients in finely divided form with 0.2 to 10% of an ammonium phosphate salt of a divalent metal selected from the group consisting of cadmium, cobalt, copper, iron, magnesium, maganese, nicel, zinc and the uranyl radical, applying said mixture to the ceramic body to be colored, heating the ceramic body to a temperature and for a time sufficient to fuse the colored coating and finally cooling the glazed body.

4. A process for producing ceramic bodies provided with uniquely colored glazes which comprises preparing a siliceous glaze composition having as its essential ingredients 35 to 50% feldspar, 15 to 21% kaolin, 17 to 22% calcium carbonate, 0 to 24% silica, and 0 to 22% flint, mixing said ingredients in finely divided form with 0.2 to 10% of an ammonium phosphate salt of a divalent metal selected from the group consisting of cadmium, cobalt, copper, iron, magnesium, manganese, nickel, zinc and the uranyl radical in a floating medium to form a liquid suspension, applying a coating of said suspension to said ceramic body, heating the coated body to a temperature and for a time sufficient to fuse said coating and finally cooling the coated body.

5. A process for producing a uniquely colored enamel which comprises preparing an enamel base of the type suitable for coating metals, mixing with the enamel ingredients in finely divided form from 0.2 to 10% of an ammonium phosphate salt of a divalent metal selected from the group consisting of cadmium, cobalt, copper, iron, magnesium, manganese, nickel, zinc and the uranyl radical in a floating medium to form a liquid suspension, applying a coating of said suspension to a metal, heating the coated metal to a temperature and for a time sufficient to fuse the enamel coating and finally cooling the enameled product.

References Cited in the file of this patent

UNITED STATES PATENTS

| 2,563,900 | Wallentin et al. | Aug. 14, 1951 |
| 2,608,490 | Donahey | Aug. 26, 1952 |